April 18, 1961 — W. STELZER — 2,980,068
MOTOR MECHANISM
Filed Sept. 10, 1958 — 3 Sheets-Sheet 3

INVENTOR.
WILLIAM STELZER
BY John F. Phillips
ATTORNEY

United States Patent Office 2,980,068
Patented Apr. 18, 1961

2,980,068
MOTOR MECHANISM

William Stelzer, Bloomfield Hills, Mich., assignor to Kelsey-Hayes Company, Detroit, Mich., a corporation of Delaware Filed Sept. 10, 1958, Ser. No. 760,164

19 Claims. (Cl. 121—41)

This invention relates to a motor mechanism, and more particularly to such a mechanism adapted for use as a fluid pressure operated brake booster mechanism.

It has been proposed in fluid pressure motors to provide a tandem motor mechanism to secure maximum operating forces with motors of minimum diameters by employing two or more pressure responsive units, one side of each of which is exposed to a variable pressure chamber, and to transmit force from the pressure responsive units to a member to be operated for the performance of work. Such mechanisms are usually relatively complicated and expensive to manufacture.

Particularly in brake booster motors, it is now conventional to provide for relative movement between the pressure responsive unit of the motor and the member to be operated, and to utilize such relative movement for the transmission of reaction forces, usually through levers, to oppose motor operating movement of the brake pedal, thus transmitting to the brake pedal reaction forces proportional to hydraulic pressures generated in the master cylinder.

An important object of the present invention is to provide a novel type of tandem motor mechanism wherein a pair of pressure responsive units each has a variable pressure chamber at one side thereof, and to provide novel structural means inherent in the motor structure for maintaining the variable pressure chambers in communication with each other so that when the pressure is changed in one of said chambers, by a suitable simple valve mechanism, a corresponding pressure is immediately established in the other variable pressure chamber.

A further object is to provide a motor of this character wherein one of the pressure responsive units is employed in novel combination with a separating plate which cooperates with the motor casing in such a manner as to establish by extremely simple means fixed communication between the two variable pressure chambers of the motor.

A further object is to provide a motor mechanism of the character referred to wherein lever reaction means is employed in a novel manner as compared with the use of such reaction means in conventional motors having a single pressure responsive unit.

A further object is to provide a tandem motor wherein one pressure responsive unit directly transmits forces to the member to be operated while the other pressure responsive unit is employed in conjunction with reaction levers to transmit reaction forces to the valve control member connected to the brake pedal, and the second-mentioned pressure responsive unit is mounted relative to the other such unit so as to partake of movement relative thereto for operating the reaction levers.

A further object is to provide a novel association of the reaction levers with the member to be operated so as to provide for relatively free initial movement of the valve operating member from normal off position, thereby providing a "soft" initial pedal operation, and to utilize a novel counter-reaction spring to delay the functioning of the reaction levers until the member to be operated has encountered predetermined resistance to its operation.

Other objects and advantages of the invention will become apparent during the course of the following description.

In the drawings I have shown one embodiment of the invention. In this showing:

Figure 1:
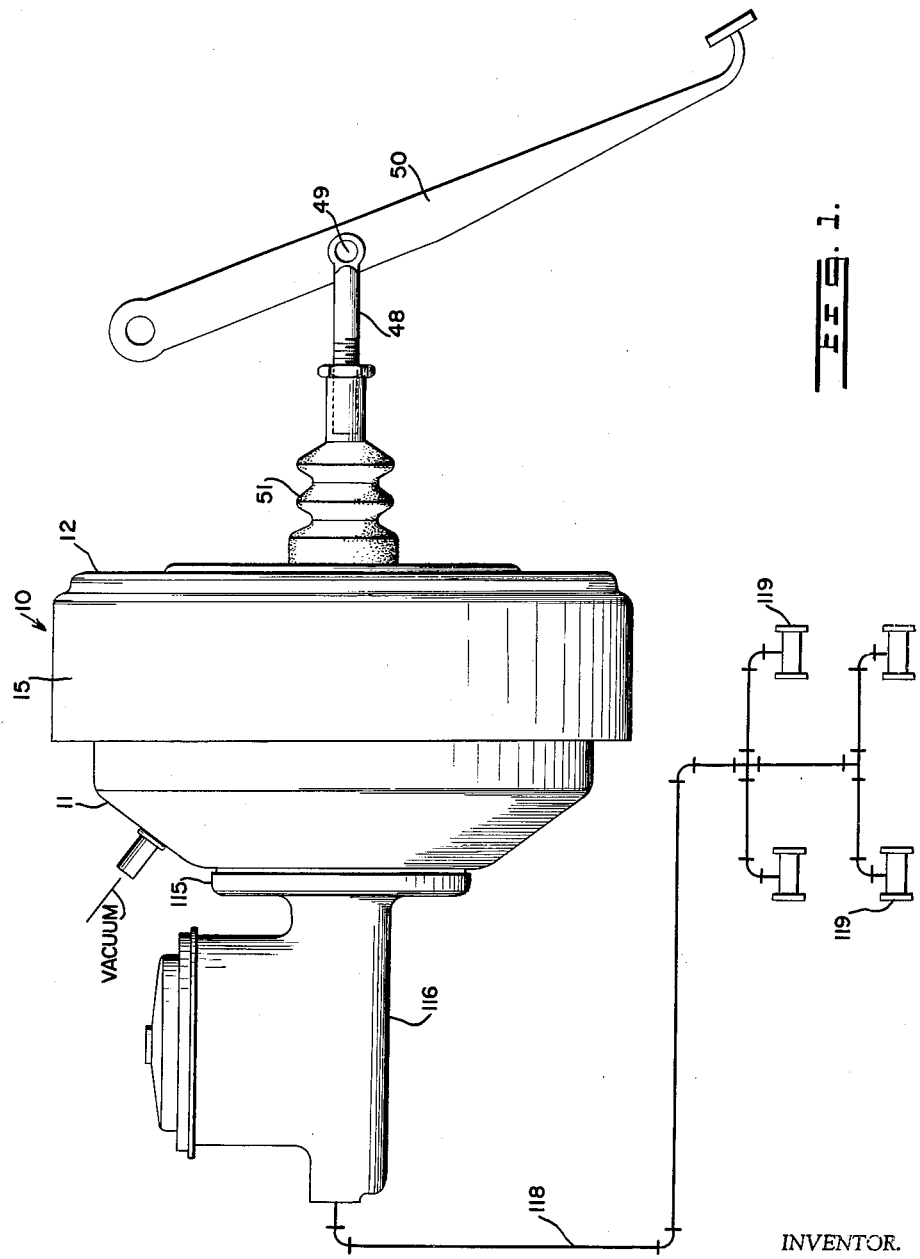
Figure 1 is a side elevation of a booster mechanism embodying the invention, the fluid lines from the master cylinder and the vehicle wheel cylinders being diagrammatically represented.

Referring to the drawings, the numeral 10 designates the motor unit as a whole, comprising casing sections 11 and 12. The outer periphery of the casing section 11 is shaped with an annular channel 13 terminating in an outwardly extending annular rib 14 secured to the cylindrical portion 15 of the casing section 12 in any suitable manner forming no part of the present invention.

A separator plate 18 is arranged in the casing section 12 and is provided with a generally cylindrical outer flange 19. Such cylindrical flange is positioned within and centered by inwardly extending longitudinal ribs 20 stamped from the cylindrical wall 15 of the casing section 12. It will be noted that the ribs 20 provide fluid passages, for a purpose to be described.

The flange 19 is shaped to provide a channel 24 (Figure 2) receiving an annular bead 25 formed on the radially outer edge of an annular diaphragm 26, the bead 25 being retained in position in the channel 24 by a split snap ring 27 the ends of which tightly abut when the parts are assembled to maintain a tight sealing relationship between the bead 25 and channel 24.

The diaphragm 26 is provided at its radially inner edge with a bead 28 retained in position by a rolled channel 29 formed at the radially outer edge of a plate 30. This plate and the diaphragm 26 divide the casing section 12 to form a constant pressure chamber 32 and a variable pressure chamber 34. It will be noted that the ribs 20 (Figure 2) continue around the adjacent extremity of the channel 24 so that the spaces between the ribs 20 are in constant communication with the chamber 34.

The radially inner edge of the plate 30 is fixed to a valve housing 38 in sealed relation thereto. A tubular member 39 extends through the right-hand wall of the housing section 12 as shown in Figure 2 and has its inner end turned radially outwardly and fixed to the housing 38. Such end of the tube 39 fixes in position relative to the valve housing 38 the outer bead of a diaphragm unit 40, which carries a rubber or similar resilient valve 41. The space 42 within the diaphragm unit 40 communicates through passages 43 with a bore 44 formed in the body of a control member 45 slidable in the valve housing 38 in sealed relation thereto. The control member 45 is connected to one end of a control rod 48, the end of which remote from the motor 10 is pivotally connected as at 49 (Figure 1) to a pedal lever 50 preferably of the depending type. A boot 51 is connected between the control rod 48 and the casing section 12.

The control member 45 is slidable in the tube 39, and the latter is slidable through a bearing 54 carried by the casing section 12. The tube 39 is preferably sealed in its sliding relation to the casing section 12 as at 55.

The valve housing 38 is provided with a pair of chambers 56 and 57, communication between which is controlled by engagement with the valve 41 of a valve seat 58 formed in the valve housing 38. The seat 58 is normally disengaged from the valve 41 as shown. The chamber 57 is in fixed communication with the variable pressure chamber 34 through one or more passages 60. The chamber 56 communicates with the motor chamber 32 through a passage 61.

The control member 45 is provided with a valve seat 62 normally engaging the valve 41, thus normally disconnecting the chambers 42 and 56. The valve 42 is biased toward the two valve seats 58 and 62 by a spring 63. Obviously, when the control member 45 moves to the left in Figure 2, the spring 63 causes the valve 41 to follow the seat 62 and then become engaged with the seat 58, whereupon further movement of the seat 62 will energize the motor unit as described below.

The diaphragm 26 and plate 30 constitute one of the pressure responsive units of the motor. The second such unit comprises a plate 65 and a diaphragm 66 forming with the left-hand end of the casing section a constant pressure chamber 67 having a nipple 68 connectible with a fluid line, preferably leading to a source of vacuum such as the intake manifold of the vehicle engine.

The diaphragm 66 is provided with a radially outer bead 70 provided with spaced projections 71 engaging the plate 18. The bead 70 accordingly is maintained in position by the channel 13, flange 14 and plate 18. The projections 17 maintain open communication between the passages formed by the ribs 20 and a variable pressure motor chamber 72 formed between the plate 18 and the plate 65 and diaphragm 66.

The radially inner extremity of the plate 65 terminates in an annular radial flange 75 against which is welded a retaining plate 76 for holding in position the radially inner bead of an annular diaphragm 77. This diaphragm is provided with a radially outer bead 78 fixed in position by rolling thereover a channel 79 formed at the radially inner extremity of the plate 18. Obviously, the plate 18 and diaphragm 77 cooperate to form one wall of the variable pressure chamber 72 and to seal such chamber from the chamber 32. The plate 65 is connected to the diaphragm 66 in the same manner as the plates 18 and 30 are connected to their associated diaphragms.

The control member 45 is secured as at 85 to a flange 86, carried by a member to be operated by the motor mechanism, shown in the present instance as an axial operating rod 87. This operating rod is provided with an axial passage 88 therethrough for a purpose to be described, and one end of this passage is enlarged to form a seat for a spring 89 engaging the control member 45 to bias it to the normal off position shown in Figure 2.

Figure 2:
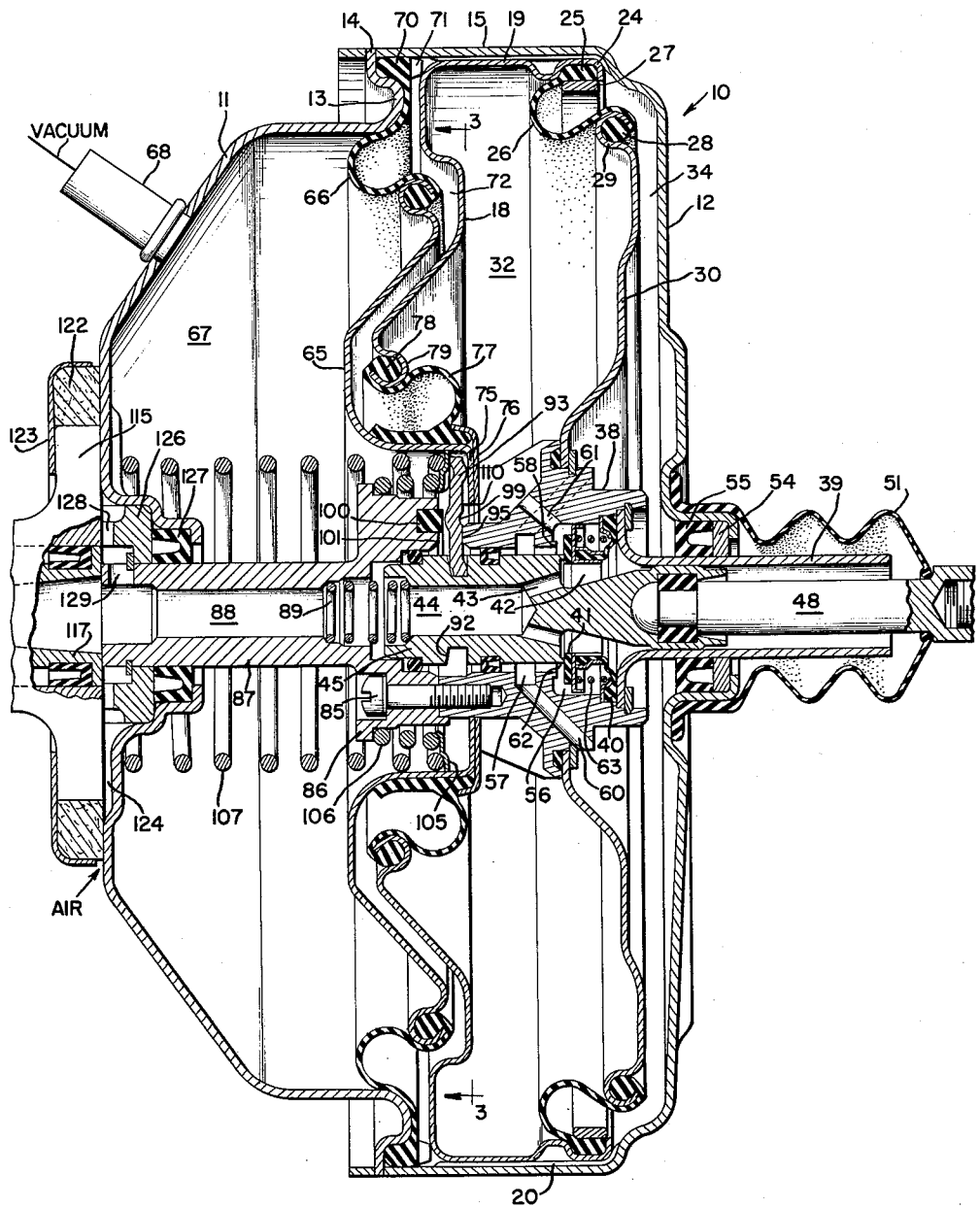
Figure 2 is an enlarged axial sectional view through the motor unit and associated parts.
Figure 3:
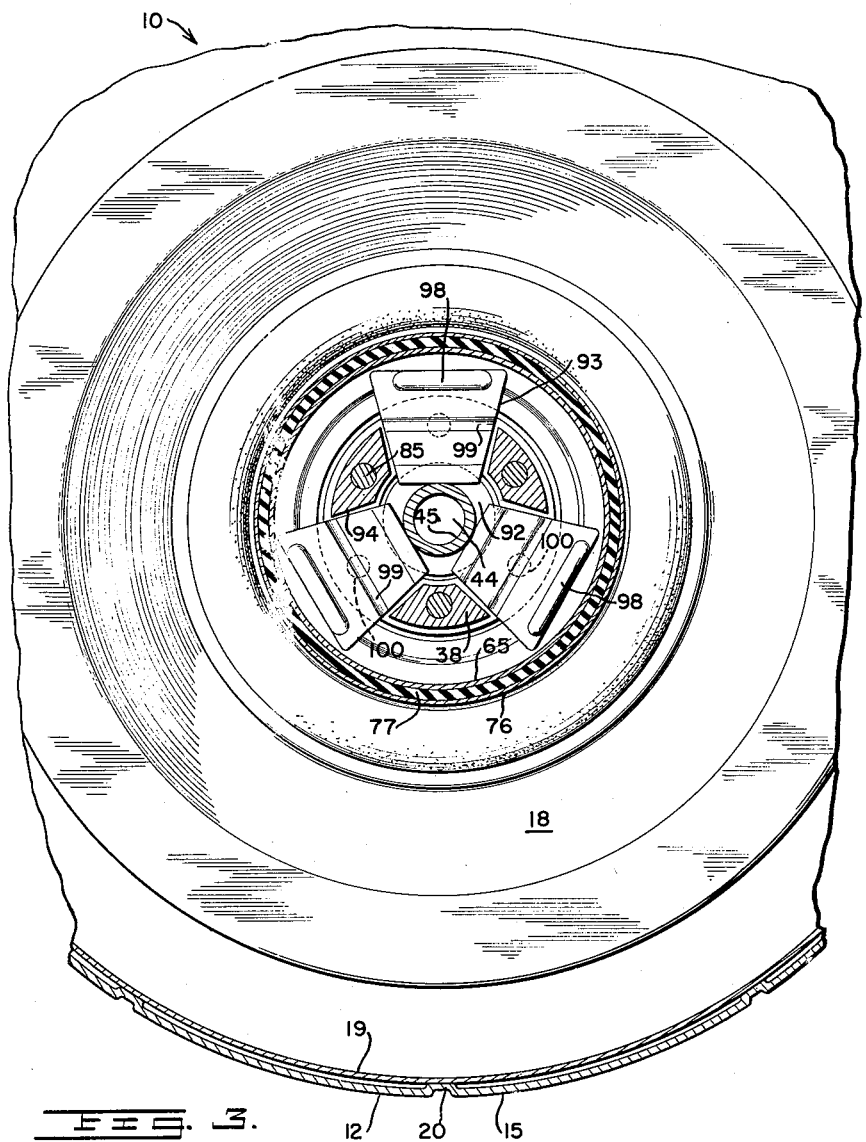
Figure 3 is a fragmentary transverse sectional view on line 3—3 of Figure 1.

The control member 45 is provided with an annular groove 92 in which are arranged the radially inner ends of lever elements 93 shaped as shown in Figure 3. The valve housing 38 is provided with radial openings 94 (Figure 3) through which the levers 93 project, one side of each of such openings forming a shoulder 95 (Figure 2) against which the levers engage when the parts are in off positions.

Each lever 93 is provided at its radially outer extremity with a rib 98 engageable against the flange 75 of the plate 65, these ribs terminating short of the side edges of the levers as shown in Figure 3 for a purpose to be described. Intermediate its radially inner and outer edges, each lever is provided with a rib 99 engageable with a resilient button 100 recessed into the flange 86 and projecting beyond a face 101 thereof.

An annular spring seat 105 is arranged adjacent the radially outer end portions of the levers 93 and engages against the corner portions thereof beyond the ends of the ribs 96. A counter-reaction spring 106 engages at opposite ends against the spring seat 105 and a portion of the flange 86 to bias the radially outer ends of the levers 93 into engagement with the flange 75. The spring seat 105 also is engaged by one end of a return spring 107, the other end of which engages the end wall of the housing section 11 to bias the pressure responsive units to the normal off positions shown.

It will be noted that the flanges 75 and 76 are slidable on the adjacent portion of the valve housing 38. Such flanges are notched as at 110 to establish fixed communication between the vacuum chambers 32 and 67. Thus it will be apparent that since the chamber 67 is always in communication with the source of vacuum through the nipple 68, the same vacuum is always maintained in the chamber 32.

The end wall of the housing section 11 is secured in any suitable manner to a flange 115 carried by a conventional master cylinder 116 in which is arranged a conventional fluid displacing plunger 117 engaged by the rod 87 (Figure 2). Fluid displaced from the master cylinder flows through lines 118 to the vehicle wheel cylinders 119.

Around the flange 115 is an annular air cleaning element 122 retained in position by a cap 123. Portions of the end wall of the housing section 111 are offset inwardly to form air passages 124. The end wall of the housing section 11 carries a bearing 126 through which the rod 87 is slidable, and the rod is preferably sealed against leakage as at 127. The bearing 126 is suitably cut away as at 128 for the flow of air from passages 124 through a port 129 into the bore 88. Thus this bore, the bore 44 and chamber 42 are always open to atmospheric pressure.

*Operation*

The parts normally occupy the off positions shown in Figure 2. The chambers 32 and 67 communicate with each other as stated above, and vacuum is constantly maintained in these chambers because of the connection 68 with the source of vacuum. Since the valve seat 62 will be engaged with the valve 41, atmospheric pressure will be cut off from the chamber 56. The valve seat 58, being spaced from the valve 41, it will be apparent that the right-hand chamber 34 in Figure 2 will be connected to vacuum through passage 60, chamber 57, passage 61 and vacuum chamber 32. Vacuum thus will be maintained in the chamber 34 and this chamber communicates with the intermediate variable pressure chamber 72 through the passages between the ribs 20 and between the projections 71. Accordingly, the motor will be completely vacuum-balanced. The counter-reaction spring 106 maintains the radially outer ends of the levers 93 against the flange 75 and against the shoulders 95, the fulcrum ribs 99 of the levers being slightly spaced from the resilient elements 100. The valve return spring 89, of course, also acts to the right to maintain the levers in the normal positions referred to, and also maintains the two pressure responsive units in normal positions.

The mechanism is operated by depressing the brake pedal 50 to move the control rod 48 to the left in Figures 1 and 2. This action takes place solely against the return spring 89, there being no contact between the fulcrum ribs 99 and resilient elements 100 during initial operation of the brake pedal. Because of the leverage involved, the radially inner ends of the levers 93 move substantially double the distance of the fulcrum ribs 99, and accordingly, before any substantial contact occurs between the ribs 99 and elements 100, the motor will be slightly energized. This occurs through actuation of the control member 45 to move the valve seat 62 to the left in Figure 2. The spring 63 causes the valve 41 to follow such movement until the valve engages the seat 58, at which time the valve parts will be in lap position.

The chamber 56 will now be disconnected from both the vacuum and atmosphere. Upon slight further movement of the control member 45, the valve seat 62 will be "cracked" relative to the valve 41, and this initial opening of the valve seat 62 occurs approximately at the point of engagement of the fulcrum ribs 99 with the resilient elements 100. Such contact takes place quietly, and the deformability of the elements 100 during the next increment of movement of the control member 45 offers some opposition to movement of the radially inner ends of the levers to the left, thus slightly increasing resistance to movement of the control member 45.

The "cracking" of the valve seat 62 connects the atmospheric passage 44 to the chamber 57 and thus admits air into the chamber 34. The rise in pressure in such chamber will be communicated to the intermediate variable pressure chamber 72 by the flow of air between the ribs 20. Thus differential pressure will be built up by the admission of air into the chambers 34 and 72 and both pressure responsive units will start to move toward the left.

It will be noted that the valve housing 38 is positively connected by the screws 85 to the rod 87, and movement of the valve housing thus will transmit force to the master cylinder plunger 117 to move it to the left to displace fluid through lines 118 (Figure 1) into the wheel cylinders.

Positive force is not transmitted from the second pressure responsive unit, constituted by the diaphragm 66 and plate 65. On the contrary, such forces are delivered by the flange 75 to the radially outer ends of the levers 93 and through spring 106 to the operating rod 87. During initial operation of the motor, the two pressure responsive units move in unison since the force delivered through the spring 106 is sufficient to transmit to the rod 87 the same movement as the second pressure responsive unit.

When a predetermined hydraulic pressure has been built up in the brake lines, occurring approximately at the point of initial engagement of the shoes with the drums, the resistance to movement of the master cylinder plunger 117 and operating rod 87 is sufficient to retard movement of the flange 86 whereupon the second pressure responsive unit moves to the left relative to the first pressure responsive unit. The flange 75 thus moves the radially outer ends of the levers 93 to the left in Figure 2 to compress the spring 106 and also deform the resilient elements 100, whereupon the ribs 99 come into metal-to-metal contact with the shoulders 101. Force will now be delivered from the second pressure responsive unit through the levers 93 and fulcrum rib 99. The radially inner ends of the levers tend to swing toward the right in Figure 2, thus reacting against movement of the brake pedal. This reaction will be proportional to the pressure in the motor chamber 72 relative to the resistance to movement of the master cylinder plunger. Thus the brake pedal is provided with highly accurate "feel."

When the brake pedal is released, the spring 89 will move the control member 45 to the right to return the valve parts to normal positions. In this connection, it will be noted that the levers will have moved away from the shoulders 95, and accordingly the inner ends of the levers are free to move to the extent necessary for the return of the valve parts to normal positions. The spring 89 being stronger than the spring 63, the control member 45 will move to engage the valve seat 62 with the valve 41 and move the latter away from the seat 58. Accordingly the parts will again be vacuum-balanced, and the return spring 107 will return the pressure responsive units of the motor to normal positions.

From the foregoing, it will be apparent that the present construction provides, in a novel manner, the utilization of two pressure responsive units for transmitting forces to the member to be operated, thus providing for the generation of greater forces with a motor of minimum diameter. Because of the novel construction employed, a simple valve mechanism may be used to control pressure in only one variable pressure motor chamber, namely, the chamber 34, since this chamber is always in communication with the variable pressure chamber 72 through the passages between the ribs 20. These ribs serve to provide the passages referred to and they also serve to center and thus properly position the flange 19, and the assembly of the plate 18 and flange 19 in the motor casing 12 is quite simple.

It also will be noted that the present construction utilizes one pressure responsive unit for the direct positive application of forces to the master cylinder plunger, while the second pressure responsive unit is movable relative to the first pressure responsive unit and the rod 87. Such relative movement is utilized for the operation of the levers 93 to transmit reaction forces solely from one pressure responsive unit to the brake pedal or other control element. Moreover, the structure is such that the levers are arranged at a point wherein it is convenient to establish communication between the vacuum motor chambers 32 and 67, and exactly the same vacuum will be maintained at all times in such chambers.

The mounting and loading of the spring 106 also serve to transmit all of the forces of the second pressure responsive unit to the rod 87 during initial operation of the motor, the spring 106 being overcome at the desired point to render the levers 93 operative for transmitting reaction forces to the brake pedal.

The plates 18, 30 and 65 may be economically produced as simple stampings, and the rolling of the channels 29 and 79 around the diaphragm beads 28 and 78 respectively is a simple economical operation. Obviously, the various parts of the mechanism may be easily and conveniently assembled, thus providing a highly efficient production unit which may be made at relatively low cost.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A fluid pressure motor mechanism comprising a casing, a pair of pressure responsive units therein each having a variable pressure chamber at one side thereof and a constant pressure chamber at the other side thereof, a member to be operated connected for positive operation by one of said pressure responsive units, the other pressure responsive unit being movable axially relative to said one pressure responsive unit, a valve mechanism normally balancing pressures in said motor chambers and movable to connect said variable pressure chambers to a source of pressure to operate both pressure responsive units, said valve mechanism comprising a manually operable control member, and means connected between said other pressure responsive unit and said control member for transmitting reaction forces to the latter when movement of said member to be operated encounters predetermined resistance to movement and said other pressure responsive unit is moved relative to said one pressure responsive unit incident to the building up of pressure in the variable pressure chamber of said other pressure responsive unit.

2. A fluid pressure motor mechanism comprising a casing, a pair of pressure responsive units therein each having a variable pressure chamber at one side thereof and a constant pressure chamber at the other side thereof, a member to be operated connected for positive operation by one of said pressure responsive units, the other pressure responsive unit being movable axially relative to said one pressure responsive unit, a valve mechanism normally balancing pressures in said motor chambers and movable to connect said variable pressure chambers to a source of pressure to operate both pressure responsive units, said valve mechanism comprising a manually operable control member, and levers having radially outer ends engaging said other pressure responsive unit and radially inner ends engaging said control member, said levers intermediate their ends being fulcrumed on said member to be operated whereby, when said member to be operated encounters predetermined resistance to movement thereof, said other pressure responsive unit moves relative to said one pressure responsive unit to rock said levers and transmit reaction forces to said control member.

3. A fluid pressure motor mechanism comprising a casing, a pair of pressure responsive units therein each having a variable pressure chamber at one side thereof and a constant pressure chamber at the other side thereof, a member to be operated connected for positive operation by one of said pressure responsive units, the other pressure responsive unit being movable axially relative to said one pressure responsive unit, a valve mechanism normally balancing pressures in said motor chambers and movable to connect said variable pressure chambers to a source of pressure to operate both pressure responsive units, said valve mechanism comprising a manually operable control member, levers having radially outer ends engaging said other pressure responsive unit and radially inner ends engaging said control member, and fulcrum means comprising a resilient member carried by said member to be operated and engaging said levers intermediate their ends.

4. A fluid pressure motor mechanism comprising a casing, a pair of pressure responsive units therein each having a variable pressure chamber at one side thereof and a constant pressure chamber at the other side thereof, a member to be operated connected for positive operation by one of said pressure responsive units, the other pressure responsive unit being movable axially relative to said one pressure responsive unit, a valve mechanism normally balancing pressures in said motor chambers and movable to connect said variable pressure chambers to a source of pressure to operate both pressure responsive units, said valve mechanism comprising a manually operable control member, levers having radially outer ends engaging said other pressure responsive unit and radially inner ends engaging said control member, said levers intermediate their ends being fulcrumed on said member to be operated, and loaded spring means interposed between the radially outer ends of said levers and said member to be operated to transmit force from said other pressure responsive unit to said member to be operated, resistance to movement of said member to be operated to a degree sufficient to overcome the loading of said spring causing said other pressure responsive unit to move relative to said one pressure responsive unit to rock said levers and transmit reaction forces to said control member.

5. A fluid pressure motor mechanism comprising a casing, a pair of pressure responsive units therein each having a variable pressure chamber at one side thereof and a constant pressure chamber at the other side thereof, a member to be operated connected for positive operation by one of said pressure responsive units, the other pressure responsive unit being movable axially relative to said one pressure responsive unit, a valve mechanism normally balancing pressures in said motor chambers and movable to connect said variable pressure chambers to a source of pressure to operate both pressure responsive units, said valve mechanism comprising a manually operable control member, levers having radially outer ends engaging said other pressure responsive unit and radially inner ends engaging said control member, and fulcrum means engageable with said levers intermediate their ends, said fulcrum means comprising a fulcrum shoulder for each lever on said member to be operated and a resilient member projecting from each shoulder and engageable with the associated lever, said resilient members being normally slightly spaced from said levers whereby the inner ends of said levers are free to move relative to said fulcrum means during movement of said control member from normal position to initially operate the motor mechanism, after which said resilient members will be deformed and said levers will directly engage said shoulders when said member to be operated encounters predetermined resistance to movement thereof, whereupon said other pressure responsive unit moves relative to said one pressure responsive unit to rock said levers and transmit reaction forces to said control member.

6. A motor mechanism according to claim 5 provided with loaded spring means interposed between the radially outer ends of said levers and said member to be operated to transmit force from said other pressure responsive unit to said member to be operated, said spring means determining the degree of resistance to movement of said member to be operated which renders said other pressure responsive unit movable relative to said one pressure responsive unit.

7. A fluid motor mechanism comprising a pair of casing sections, a separator plate in one of said casing sections having a radially outer flange, a pair of pressure responsive units on opposite sides of said separator plate, one of said pressure responsive units forming with said casing a first variable pressure chamber, an annular diaphragm connected between the radially inner portion of said separator plate and said other pressure responsive unit, said separator plate and said diaphragm forming with said other pressure responsive unit a second variable pressure chamber, said one casing section and said flange having spacing ribs therebetween forming passages communicating between said variable pressure chambers, a member to be operated connected to said pressure responsive units, and a valve mechanism normally connecting one of said variable pressure chambers to a source of low pressure and being operable for connecting such variable pressure chamber to a source of higher pressure.

8. A motor mechanism according to claim 7 wherein each of said pressure responsive units comprises a radially inner plate and a radially outer diaphragm connected thereto, the diaphragm of said one pressure responsive unit being connected to said flange and the diaphragm of the other pressure responsive unit being connected to one of said casing sections.

9. A fluid motor mechanism comprising a pair of casing sections, a separator plate in one of said casing sections having a radially outer flange, a pair of pressure responsive units on opposite sides of said separator plate, one of said pressure responsive units comprising a plate and an annular diaphragm connected between such plate and said flange and forming with said one casing section a variable pressure chamber, the other pressure responsive unit comprising a plate and an annular diaphragm connected between such plate and said casing sections, an annular diaphragm connected between the radially inner extremity of said separator plate and the plate of said other pressure responsive unit, said separator plate and said last-named diaphragm forming with said other pressure responsive unit a second variable pressure chamber, said one casing section and said flange comprising a pair of elements one of which is provided with integral ribs for spacing such element from the other element to provide passages communicating between said variable pressure chambers, a member to be operated having positive driving connection with the plate of said one pressure responsive unit, a loaded spring interposed between the plate of said other pressure responsive unit and said member to be operated to deliver forces from the former to the latter, a valve mechanism having a normal position connecting one of said variable pressure chambers to a source of low pressure and being operable for connecting such variable pressure chamber to a source of higher pressure, said valve mechanism comprising an axially movable control member, said spring being compressible by forces delivered by said other pressure responsive unit when resistance to movement of said member to be operated rises to a predetermined point, and reaction means for transmitting forces from said other pressure responsive unit, incident to movement of the latter to compress said spring, to said control member to oppose valve operating movement thereof.

10. A motor mechanism according to claim 9 wherein said reaction means comprises a plurality of radial levers engaging at their outer ends against said other pressure responsive unit and at their inner ends against said control member, and being fulcrumed intermediate their ends on said member to be operated.

11. A motor mechanism according to claim 9 wherein said reaction means comprises a plurality of radial levers engaging at their outer ends against said other pressure responsive unit and at their inner ends against said control member, and fulcrumed means for said levers carried by said member to be operated, said fulcrum means comprising a shoulder facing and spaced from each lever intermediate its ends, and a resilient element projecting from the center of each shoulder and engageable with each lever intermediate its ends.

12. A fluid pressure motor mechanism comprising a casing, a separator plate in said casing, a pair of pressure responsive units on opposite sides of said separator plate, one of said pressure responsive units forming with said casing a variable pressure chamber, an annular diaphragm connected between the radially inner portion of said separator plate and said other pressure responsive unit, said separator plate and said diaphragm forming with said other pressure responsive unit another variable pressure chamber, means establishing fixed communication between said variable pressure chambers, a valve mechanism having a normal position connecting one of said variable pressure chambers to a source of relatively low pressure and being movable to disconnect such variable pressure chamber from said source and connect it to a source of higher pressure, said valve mechanism comprising a manually operable control member normally holding said valve mechanism in normal position and movable to operate said valve mechanism, a member to be operated connected to said pressure responsive units, said other pressure responsive unit having a radially inner portion movable relative to said member to be operated, loaded spring means opposing such relative movement until said member to be operated encounters predetermined resistance sufficient to overcome the loading of said spring means, and reaction means connected between said other pressure responsive unit and said control member for utilizing said relative movement for opposing valve operating movement of said control member.

13. A motor mechanism according to claim 12 wherein said reaction means comprises radial levers fulcrumed intermediate their ends to said member to be operated and having radially outer and inner ends respectively engaging said other pressure responsive unit and said control member, whereby said relative movement of said other pressure responsive unit rocks said levers and transmits reaction forces to said control member.

14. A fluid pressure motor mechanism comprising a casing structure, a pressure responsive unit having constant pressure and variable pressure chambers at opposite sides thereof, a member to be operated, an axially movable valve mechanism, including a manually operable member, having a normal position establishing balanced relatively low pressures in said chambers, and operable for connecting said variable pressure chamber to a source of higher pressure, said pressure responsive unit being movable relative to said member to be operated, a plurality of radial reaction levers engageable at their outer and inner ends respectively with said pressure responsive unit and said manually operable member, said member to be operated having recesses corresponding in circumferential position with said levers intermediate the ends thereof, and resilient fulcrum members arranged in said recesses and engageable with said levers intermediate their ends.

15. A mechanism according to claim 14 wherein said member to be operated has an annular shoulder provided with a surface adjacent and facing said levers and in which said recesses are formed, said fulcrum members projecting slightly beyond said surface to be engaged by said levers and to be deformed by the application of forces to the ends of said levers by said pressure responsive unit and said manually operable member whereby, after predetermined movement of said levers to deform said fulcrum members, said shoulder will positively limit further movement of the intermediate portions of said levers.

16. A fluid pressure motor mechanism comprising a casing structure, a pressure responsive unit having constant pressure and variable pressure chambers at opposite sides thereof, a member to be operated, an axially movable valve mechanism, including a manually operable member, having a normal position establishing balanced relatively low pressures in said chambers, and operable for connecting said variable pressure chamber to a source of higher pressure, said pressure responsive unit being movable relative to said member to be operated, a plurality of radial reaction levers engageable at their outer and inner ends respectively with said pressure responsive unit and said manually operable member, said member to be operated having recesses corresponding in circumferential position with said levers intermediate the ends thereof, resilient fulcrum members arranged in said recesses and engageable with said levers intermediate their ends, and a counter-reaction spring engaging at opposite ends against said lever and said member to be operated to transmit forces from said pressure responsive unit to said member to be operated until resistance to movement of said member to be operated overcomes said spring, whereupon said pressure responsive unit moves relative to said member to be operated to transmit movement to the radially outer ends of said levers.

17. A mechanism according to claim 16 wherein said member to be operated is provided with an annular enlargement surrounded by said spring and engaged by one end of said spring, said enlargement having a surface facing said levers, said recesses being formed in said enlargement and said fulcrum members projecting beyond said surface to engage said levers intermediate their ends whereby, after said spring is overcome, the projecting portions of said fulcrum members will be deformed and said surface will limit movement of said intermediate portions of said levers.

18. A fluid pressure motor mechanism comprising a casing structure, a pressure responsive unit having constant pressure and variable pressure chambers at opposite sides thereof, a member to be operated, an axially movable valve mechanism, including a manually operable member, having a normal position establishing balanced relatively low pressures in said chambers, and operable for connecting said variable pressure chamber to a source of higher pressure, said pressure responsive unit being movable relative to said member to be operated, a plurality of radial reaction levers engageable at their outer and inner ends respectively with said pressure responsive unit and said manually operable member, and fulcrum means engaging said levers intermediate the ends thereof, such means comprising a plurality of resilient members corresponding in circumferential position with said levers, said member to be operated having recesses respectively receiving said resilient members.

19. A motor mechanism according to claim 18 provided with counter-reaction spring means engaging at opposite ends against said levers and said member to be operated to transmit forces from said pressure responsive unit to said member to be operated until resistance to movement of said member to be operated overcomes said spring, whereupon said pressure responsive unit moves relative to said member to be operated to transmit movement to the radially outer ends of said levers.

References Cited in the file of this patent

UNITED STATES PATENTS

| | | |
|---|---|---|
| 2,322,063 | Schnell | June 15, 1943 |
| 2,393,524 | Fant | Jan. 22, 1946 |
| 2,404,932 | Stelzer | July 30, 1946 |
| 2,413,380 | Rush et al. | Dec. 31, 1946 |
| 2,587,403 | Stelzer | Feb. 26, 1952 |